(12) United States Patent
Lin

(10) Patent No.: US 9,170,384 B2
(45) Date of Patent: Oct. 27, 2015

(54) OPTICAL COUPLING LENS WITH PLUGS

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/144,575

(22) Filed: Dec. 31, 2013

(65) Prior Publication Data

US 2015/0117816 A1 Apr. 30, 2015

(30) Foreign Application Priority Data

Oct. 28, 2013 (TW) .............................. 102138854 A

(51) Int. Cl.
  *G02B 6/32* (2006.01)
  *G02B 6/42* (2006.01)
(52) U.S. Cl.
  CPC ............ *G02B 6/4214* (2013.01); *G02B 6/4231* (2013.01)
(58) Field of Classification Search
  CPC ...... G02B 6/32; G02B 6/4206; G02B 6/4214; G02B 6/4204; G02B 6/4246
  USPC ..................................... 385/14, 15, 31, 33, 39
  See application file for complete search history.

(56) References Cited

U.S. PATENT DOCUMENTS

2015/0043868 A1\* 2/2015 Kuo ................................. 385/33

\* cited by examiner

*Primary Examiner* — Jennifer Doan
(74) *Attorney, Agent, or Firm* — Novak Druce Connolly Bove + Quigg LLP

(57) ABSTRACT

An optical coupling lens includes a main body and two plugs. The main body includes a front surface, a back surface opposite to the front surface, a first optical surface, a second optical surface perpendicular to the first optical surface, a reflecting surface obliquely facing the two optical surfaces, first converging lenses formed on the first optical surface, and second converging lenses formed on the second optical surface. The plugs extend from the front surface and sandwich the first converging portions. Each plug includes a cylindrical body portion having a flat end surface, a bowl-shaped protruding portion extending from the end surface and having a top surface away from the end surface, and a buffering portion formed in the top surface. The diameter of the protruding portion decreases from the end surface to the top surface.

5 Claims, 4 Drawing Sheets

OPTICAL COUPLING LENS WITH PLUGS

BACKGROUND

1. Technical Field

The present disclosure relates to communication technologies, and particularly to an optical coupling lens having two plugs.

2. Description of Related Art

An optical fiber coupling connector includes an optical coupling lens having a number of converging portions, a receiving member, and a number of optical fibers received in the receiving member. The receiving member is assembled with the optical coupling lens by plugs of the optical coupling lens plugging in holes defined in the receiving member, thus the optical fibers are aligned and coupled with the converging portions. Each of the plugs is a cylinder with a flat end surface and a circumferential surface extending from the flat end surface, and the holes conform to the plugs.

During manufacturing the optical coupling lens using a molding die, corrosive gas exits in a cavity in the molding die which is configured for forming each of the plugs and corresponds to the flat end surface. The corrosive gas causes deformation of the circumferential surface, such as expanding or contracting. If this happens, alignment precision between the optical fibers and the converging portions will be decreased.

Therefore, it is desirable to provide an optical coupling lens to overcome or at least alleviate the above-mentioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

Figure 1:
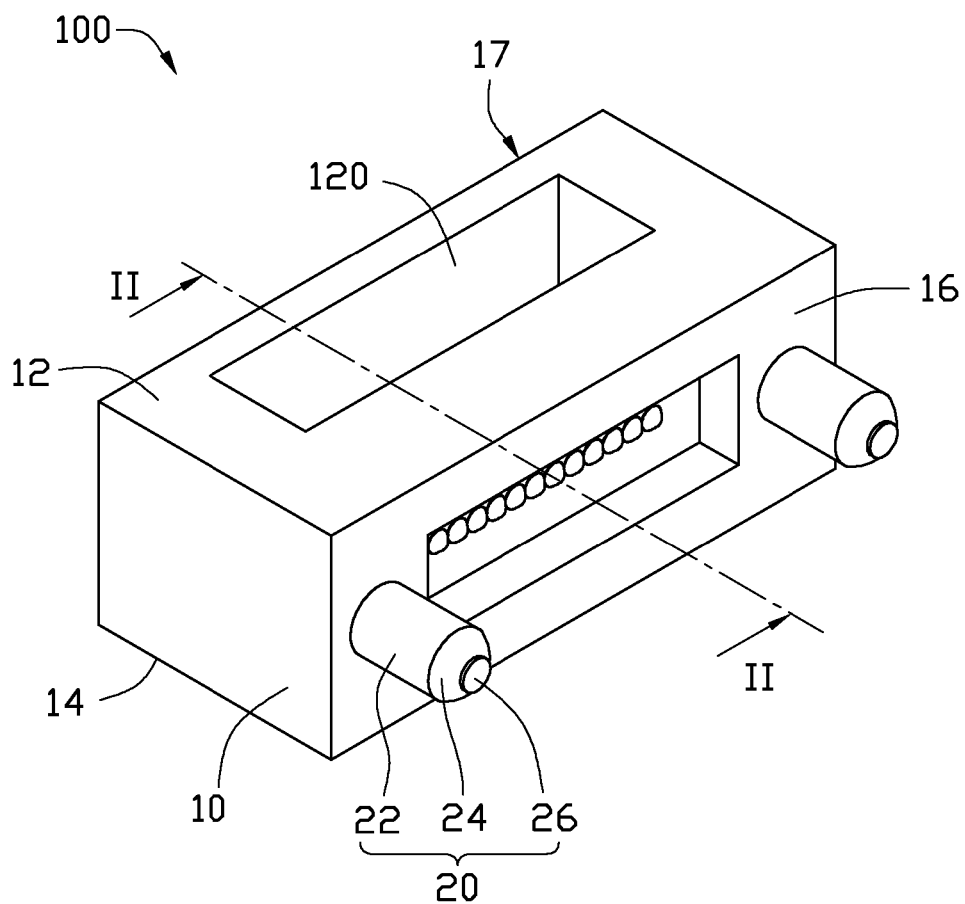
FIG. 1 is an isometric, schematic view of a first exemplary embodiment of an optical coupling lens.

FIG. 1 shows a first exemplary embodiment of an optical coupling lens 100. The optical coupling lens 100 includes a main body 10 and two plugs 20.

The main body 10 is substantially a cuboid and includes an upper surface 12, a lower surface 14, a front surface 16, a back surface 17, a number of first converging portions 18, and a number of second converging portions 19. The upper surface 12 and the lower surface 14 are positioned at opposite sides of the main body 10, and the upper surface 12 is substantially parallel to the lower surface 14. The front surface 16 and the back surface 17 are positioned at opposite sides of the main body 10, and the front surface 16 is substantially parallel to the back surface 17. The front surface 16 is interconnected between the upper surface 12 and the lower surface 14.

Figure 2:
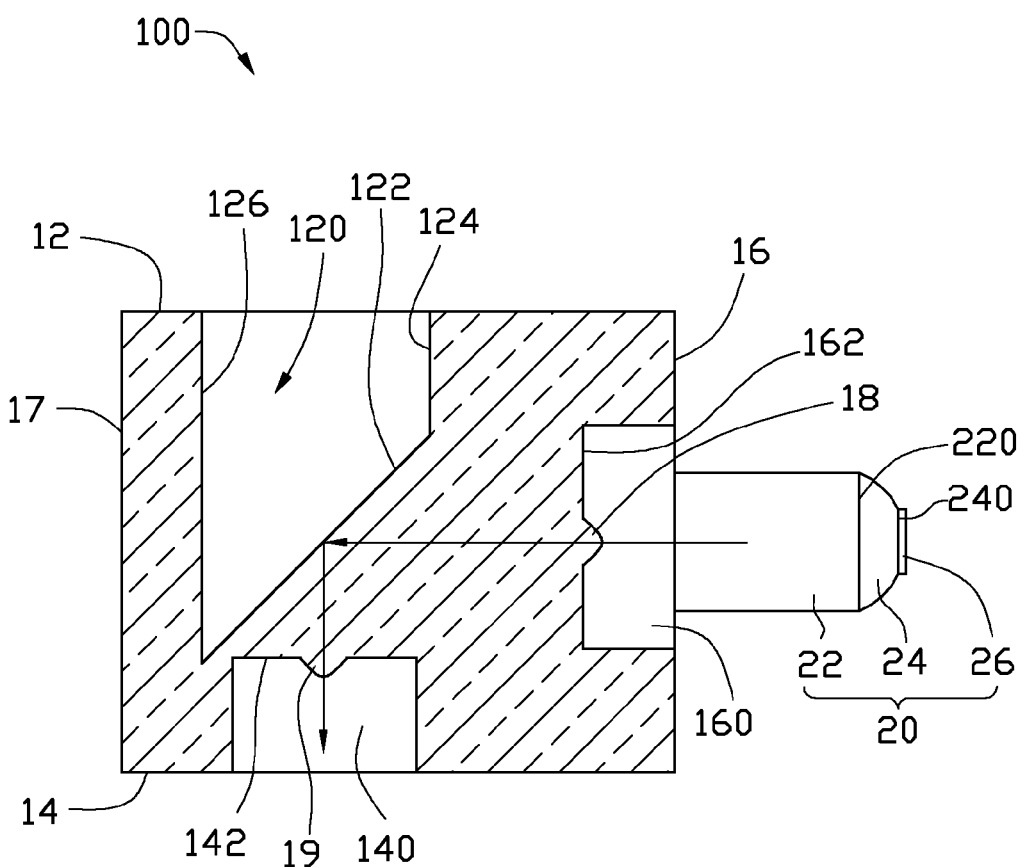
FIG. 2 is a cross-sectional view of the optical coupling lens of FIG. 1, taken along a line II-II.

FIG. 2 together with FIG. 1 show that the upper surface 12 defines an upper recess 120. The main body 10 further includes a reflecting surface 122, a first inner surface 124, and a second inner surface 126 in the upper recess 120. The reflecting surface 122 is located at a bottom of the upper recess 120. The first inner surface 124 is perpendicularly connected to the upper surface 12, the second inner surface 126 is perpendicularly connected to the upper surface 12 and faces the first inner surface 124. The reflecting surface 122 is obliquely interconnected between the first inner surface 124 and the second inner surface 126.

The front surface 16 defines a front recess 160. The main body 10 further includes a first optical surface 162 in a bottom of the front recess 160. The first optical surface 162 is substantially parallel to the front surface 16. In this embodiment, an included angle between a main plane of the first optical surface 162 and a main plane of the reflecting surface 122 is about 45 degrees.

The lower surface 14 defines a lower recess 140. The main body 10 further includes a second optical surface 142 in a bottom of the lower recess 140. The second optical surface 142 is substantially parallel to the lower surface 14. In this embodiment, an included angle between a main plane of the second optical surface 142 and a main plane of the reflecting surface 122 is about 45 degrees.

The first converging portions 18 are formed on the first optical surface 162 and face the reflecting surface 122. The first converging portions 18 are spaced from each other and are arranged in a first straight line, which is substantially parallel to the reflecting surface 122. The second converging portions 19 are formed on the second optical surface 142 and face the reflecting surface 122. The second converging portions 19 are spaced from each other and are arranged in a second straight line, which is substantially parallel to the reflecting surface 122. The second converging portions 19 correspond to the first converging portions 18. The first straight line is substantially parallel to the second straight line. When the optical coupling lens 100 is in use, half of the second converging portions 19 are aligned with light-emitting modules (not shown), and the other half of the second converging portions 19 are aligned with light-receiving modules (not shown). In this embodiment, each of the first converging portions 18 and each of the second converging portions 19 is a convex lens.

The two plugs 20 perpendicularly extend from the front surface 16 at opposite sides of the front recess 160. That is, the front recess 160 is positioned between the two plugs 20. In this embodiment, centers of the plugs 20 are arranged in the first straight line. Each of the plugs 20 includes a body portion 22, a protruding portion 24, and a buffering portion 26. The body portion 22 is substantially cylindrical and includes a flat end surface 220. The protruding portion 24 is substantially bowl-shaped and extends from the flat end surface 220. The protruding portion 24 includes a top surface 240 away from the flat end surface 220. The diameter of the protruding portion 24 decreases from the end surface 220 to the top surface 240. The buffering portion 26 is substantially cylindrical and perpendicularly extends from the top surface 240.

When the optical coupling lens 100 is in use, light beams emitting from the light-emitting modules pass through the corresponding second converging portions 19 and become parallel light beams. The parallel light beams are reflected by the reflecting surface 122 toward the corresponding first converging portions 18, and are converged by the corresponding first converging portions 18 to the corresponding optical fibers (not shown). Accordingly, light beams from the optical fibers (not shown) pass through the corresponding first converging portions 18 and become parallel light beams. The parallel light beams are reflected by the reflecting surface 122 toward the corresponding second converging portions 19, and are converged by the corresponding second converging portions 19 to the corresponding light-receiving modules.

During manufacturing of the optical coupling lens 100 using a molding die, molten material is injected into a cavity of the molding die. A portion of molten material, which is used to form the buffering portion 26 can cancel out the impact force of the corrosive gas formed in the cavity during the injecting of the molten material. Therefore the deformation of the circumferential surface of each of the plugs 22 is avoid, and the alignment precision between the optical fibers and the first converging portions 18 can be assured.

Figure 3:
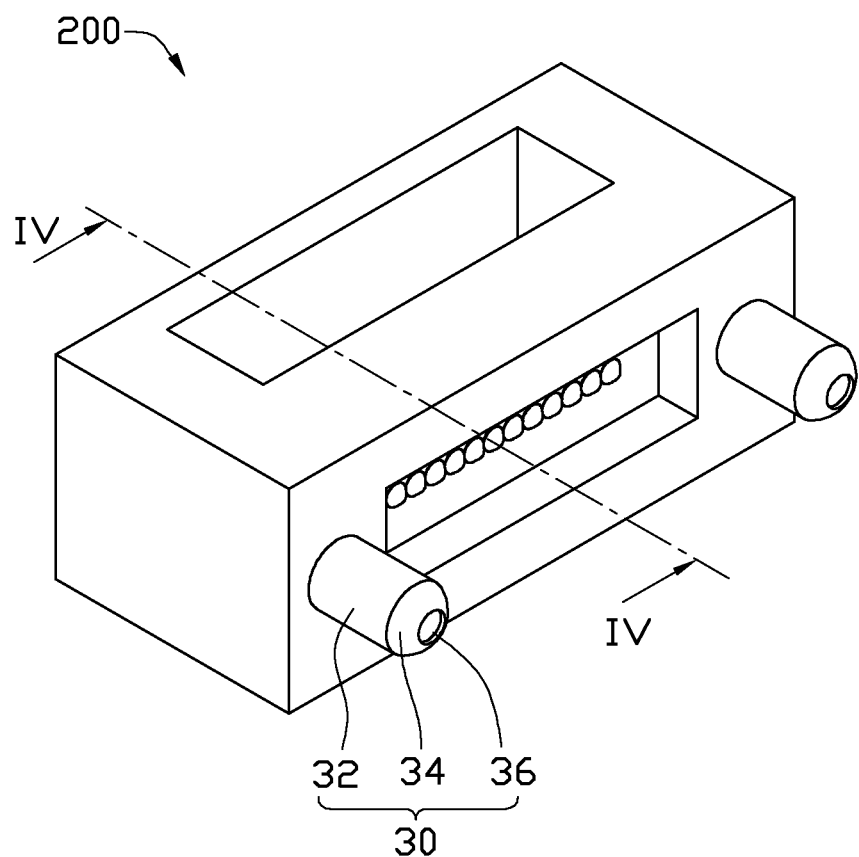
FIG. 3 is an isometric, schematic view of a second exemplary embodiment of an optical coupling lens.
Figure 4:
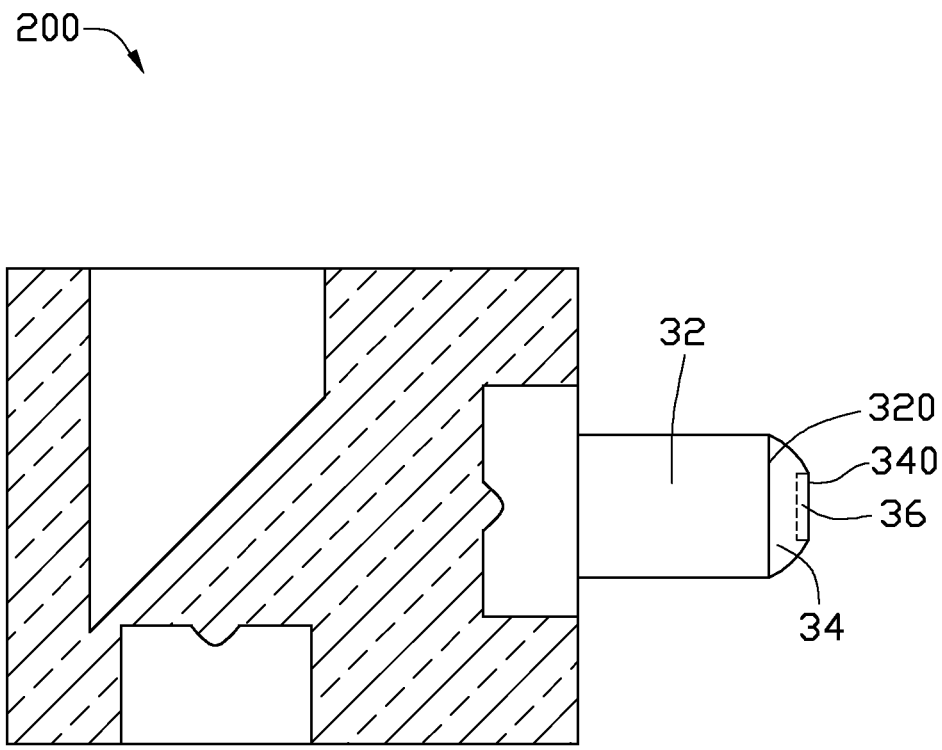
FIG. 4 is a cross-sectional view of the optical coupling lens of FIG. 3, taken along a line IV-IV.

FIGS. 3-4 show a second exemplary embodiment of an optical coupling lens 200. Difference between the optical coupling lens 200 of the embodiment and the optical coupling lens 100 of the first embodiment is that the two plugs 20 are replaced with the two plugs 30. In detail, each of the plugs 30 includes a body portion 32, a protruding portion 34, and a buffering portion 36. The body portion 32 is substantially cylindrical and includes a flat end surface 320. The protruding portion 34 is substantially bowl-shaped and extends from the flat end surface 320. The protruding portion 34 includes a top surface 340 away from the flat end surface 320. The diameter of the protruding portion 34 decreases from the end surface 320 to the top surface 340. The buffering portion 36 is substantially a cylindrical hole defined in a central portion of the top surface 340.

Advantages of the optical coupling lens 200 of the second embodiment are similar to those of the optical coupling lens 100 of the first embodiment.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical coupling lens comprising:
    a main body comprising a front surface, a back surface opposite to the front surface, a first optical surface recessed from the front surface to the back surface, a second optical surface perpendicular to the first optical surface, a reflecting surface obliquely facing the first optical surface and the second optical surface, first converging lenses formed on the first optical surface, and second converging lenses formed on the second optical surface; and
    two plugs extending from the front surface, the first converging portions located between the two plugs and corresponding to the second converging portions, each of the plugs comprising a cylindrical body portion, a bowl-shaped protruding portion, and a buffering portion, the body portion comprising a flat end surface, the protruding portion extending from the flat end surface and comprising a top surface away from the end surface, the diameter of the protruding portion decreasing from the end surface to the top surface, and the buffering portion formed in the top surface, wherein the buffering portion is substantially a cylindrical hole defined in a central portion of the top surface.

2. The optical coupling lens of claim 1, wherein the main body further comprises an upper surface and a lower surface opposite to the upper surface, the upper surface defines an upper recess, the reflecting surface is positioned at a bottom of the upper recess, the lower surface defines a lower recess, and the second optical surface is positioned at a bottom of the lower recess.

3. The optical coupling lens of claim 2, wherein the main body further comprises a first inner surface and a second inner surface in the upper recess, the first inner surface is perpendicularly connected to the upper surface, the second inner surface is perpendicularly connected to the upper surface and faces the first inner surface, and the reflecting surface is obliquely interconnected between the first inner surface and the second inner surface.

4. The optical coupling lens of claim 1, wherein the first converging portions are arranged in a first straight line, the second converging portions are arranged in a second straight line, and the first straight line is substantially parallel to the second straight line.

5. The optical coupling lens of claim 1, wherein an included angle between a main plane of the first optical surface and a main plane of the reflecting surface is about 45 degrees, and an included angle between a main plane of the second optical surface and a main plane of the reflecting surface is about 45 degrees.

* * * * *